United States Patent
Borro et al.

(10) Patent No.: US 10,554,534 B1
(45) Date of Patent: Feb. 4, 2020

(54) CLEARING MESSAGE BROKER SYSTEM MESSAGING GATEWAY

(75) Inventors: Todd Borro, Evanston, IL (US); David Hoag, Naperville, IL (US); Ajay Madhavan, Chicago, IL (US); Eric Yeh, Arlington Heights, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 1127 days.

(21) Appl. No.: 11/381,287

(22) Filed: May 2, 2006

Related U.S. Application Data (63) Continuation-in-part of application No. 11/234,727, filed on Sep. 23, 2005, now Pat. No. 8,149,732.

(51) Int. Cl.
*G06Q 40/00* (2012.01)
*H04L 12/701* (2013.01)

(52) U.S. Cl.
CPC .................................. *H04L 45/00* (2013.01)

(58) Field of Classification Search
USPC .................. 705/1, 35, 36 R, 37, 38
See application file for complete search history.

(56) References Cited

U.S. PATENT DOCUMENTS

| | | | | |
|---|---|---|---|---|
| 5,014,265 A | * | 5/1991 | Hahne | H04L 47/10 370/236 |
| 5,581,804 A | * | 12/1996 | Cameron | H04H 20/67 455/456.1 |
| 5,602,839 A | | 2/1997 | Annapareddy et al. | |
| 5,870,556 A | * | 2/1999 | Cote et al. | 709/224 |
| 6,333,933 B1 | | 12/2001 | Yoshizawa et al. | |
| 6,781,992 B1 | * | 8/2004 | Rana et al. | 370/394 |
| 7,009,987 B1 | | 3/2006 | Matsuzawa et al. | |
| 7,143,060 B2 | | 11/2006 | Foster et al. | |
| 7,286,529 B1 | | 10/2007 | Thomas | |
| 7,394,772 B2 | | 7/2008 | Shin et al. | |
| 8,149,732 B1 | | 4/2012 | Borro et al. | |
| 2001/0021189 A1 | | 9/2001 | Shiota | |
| 2002/0103930 A1 | | 8/2002 | Kamentsky et al. | |
| 2003/0105800 A1 | * | 6/2003 | Cullen | 709/201 |
| 2003/0163589 A1 | * | 8/2003 | Bunce | H04L 49/1546 709/250 |
| 2003/0165139 A1 | | 9/2003 | Chen et al. | |
| 2003/0226046 A1 | * | 12/2003 | John | 713/300 |
| 2004/0052212 A1 | | 3/2004 | Baillargeon | |

(Continued)

OTHER PUBLICATIONS

IBM Technical Disclosure Bulletin, "Header for Messages within a Computer Network". Jul. 1972, vol. 5, No. 2, pp. 586-588.*

(Continued)

*Primary Examiner* — Olabode Akintola
(74) *Attorney, Agent, or Firm* — Lempia Summerfield Katz LLC (57) ABSTRACT

Systems and methods are provided for efficiently permitting the transmission and receipt of trading messages between message sources configured to use a variety of different protocols. Messaging gateways may be configured to reformat messages for proper transmission across a transport mechanism. Messaging gateways may also insert sequence and group information into message headers to facilitate processing messages in the proper order. Messages may be processed with processing threads that are dynamically allocated by messaging gateways.

12 Claims, 5 Drawing Sheets

(56) References Cited

U.S. PATENT DOCUMENTS

| | | | |
|---|---|---|---|
| 2004/0187112 A1* | 9/2004 | Potter, Jr. | G06F 9/4843 |
| | | | 718/100 |
| 2004/0209629 A1* | 10/2004 | Virolainen | G10H 1/0066 |
| | | | 455/466 |
| 2004/0215596 A1 | 10/2004 | Fukuhara et al. | |
| 2005/0021622 A1* | 1/2005 | Cullen | 709/204 |
| 2005/0025051 A1 | 2/2005 | Roeder | |
| 2005/0078605 A1* | 4/2005 | Huang | H04L 29/06 |
| | | | 370/235 |
| 2005/0117576 A1 | 6/2005 | McDysan et al. | |
| 2005/0243824 A1 | 11/2005 | Abbazia, Jr. et al. | |
| 2005/0278410 A1* | 12/2005 | Espino | 709/201 |
| 2006/0036679 A1* | 2/2006 | Goodman et al. | 709/203 |
| 2006/0215666 A1 | 9/2006 | Shepherd et al. | |
| 2006/0268914 A1* | 11/2006 | Smith | H04L 43/18 |
| | | | 370/412 |
| 2007/0022429 A1* | 1/2007 | Rosenbluth | G06F 9/52 |
| | | | 718/108 |

OTHER PUBLICATIONS

Non-Final Office Action dated Feb. 28, 2011 in U.S. Appl. No. 11/234,727.

Fenner & Meyer, "RFC 3618: Multicast Source Discovery Protocol (MSDP)", Oct. 2003.

* cited by examiner

CLEARING MESSAGE BROKER SYSTEM MESSAGING GATEWAY

The present application is a continuation-in-part of U.S. patent application Ser. No. 11/234,727, filed Sep. 23, 2005, and entitled "Clearing Message Broker System" (now U.S. Pat. No. 8,149,732), the entire disclosure of which is hereby incorporated by reference.

FIELD OF THE INVENTION

The present invention relates to distributed computing systems that exchange messages.

More particularly, aspects of the invention providing messaging systems and methods that may be used by exchange computer systems to exchange messages in a cost-efficient manner.

DESCRIPTION OF THE RELATED ART

Modern exchanges use a variety of different computer systems to match trades, clear trades and perform other exchange functions. It is common for exchanges to use computer hardware and software that rely on point-to-point routing of messages between applications that are initially designed to support different protocols. For example, a software application may be structured to create messages formatted in accordance with a first protocol and another software application may only be able to interpret messages formatted in accordance with a second protocol.

Typically these types of incompatibility issues have been addressed by modifying the software applications. In the example given above, the software application creating the message may be modified to create messages formatted in accordance with the second protocol. When the number of software applications and transport mechanisms reach the level found at modern exchanges, the overhead incurred in modifying applications and transport mechanisms so that each application is capable of communicating with all other relevant applications becomes enormous. For example, adding a software application may require modifying several other existing applications, which may have already been modified before.

Therefore, there is a need in the art for systems and methods that allow application to communicate with one another while reducing the overhead incurred in maintaining such systems.

SUMMARY OF THE INVENTION

Aspects of the present invention overcome problems and limitations of the prior art by providing trading methods and systems to more efficiently provide for the transmission and receipt of trading messages. One aspect relates to associating an application to a messaging gateway that may be configured to alter the message for proper transmission. In one embodiment, the messaging gateway formats the message for proper transmission through one or more transport protocols. In yet another embodiment, the messaging gateway formats the message to allow another unrelated application to receive and/or read the message. Another aspect relates to assigning one router with a distributed computing environment to serve as a partitioning coordinator router. The dynamic partitioning of the routers does not require reconfiguration of the router to the specific sources or applications it has been assigned to. In one embodiment, the first router detected may serve as the partitioning coordinator router. Yet still further aspects of the invention relate to allowing the partitioning coordinator router to dynamically partition the available sources or applications configured to transmit among the available routers. Computer readable instructions may comprise routing rules configured, that when executed, allow for content based routing as opposed to point-to-point based routing. The content based routing may be accomplished regardless of the protocols of the different sources and/or endpoints and Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION OF THE INVENTION

Figure 1:
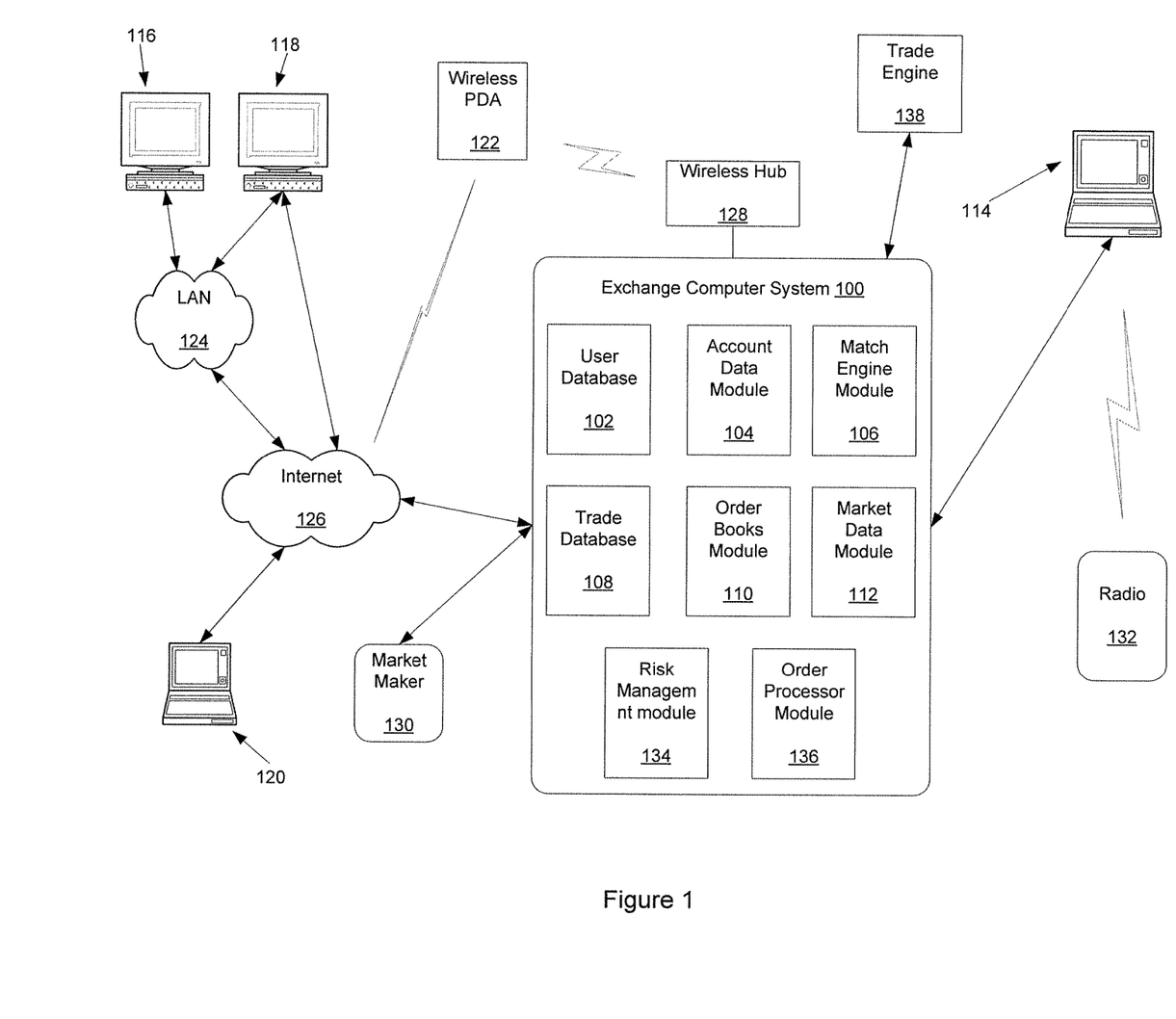
FIG. 1 shows a computer network system that may be used to implement aspects of the present invention.

Aspects of the present invention may be implemented with computer devices and computer networks that allow exchanges to process trades and exchange data among applications. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords potentially with other information to identify users uniquely or collectively. An account data module 104 may process account information that may be used during trades. A match engine module 106 is included to match bid and offer prices. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose variable defined derivative product and aggregate order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems. Coupling can be direct as described or any other method described herein.

The operations of computer devices and systems shown in FIG. 1 may be controlled by computer-executable instructions stored on a computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
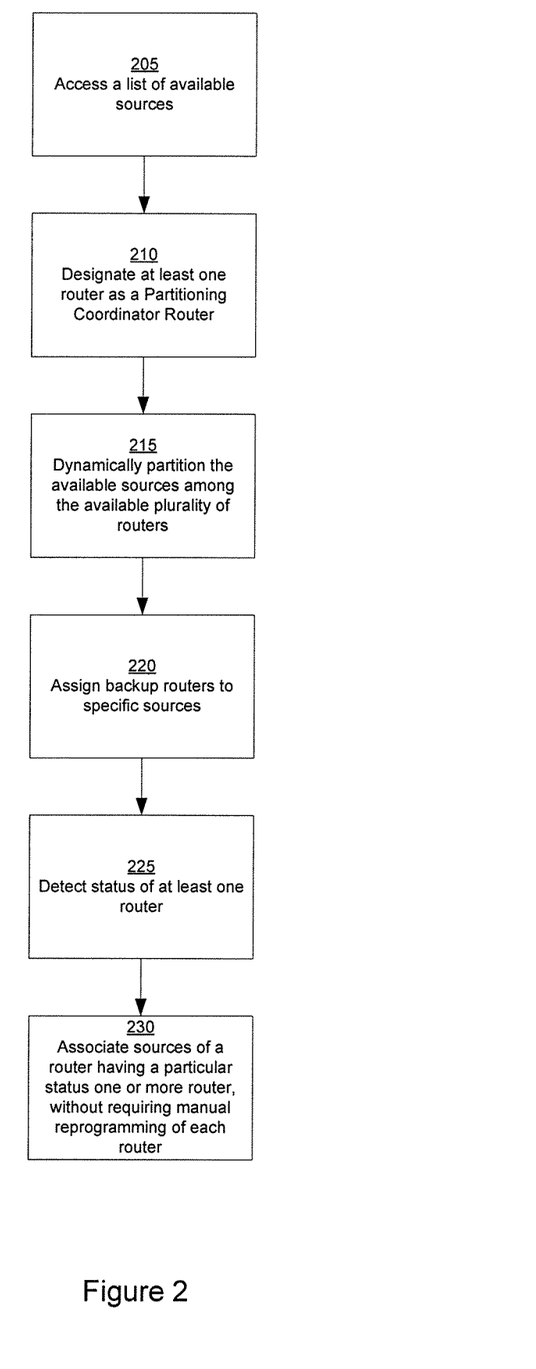
FIG. 2 illustrates a flowchart of one exemplary computer implemented method according to an embodiment of the present invention.
Figure 3:
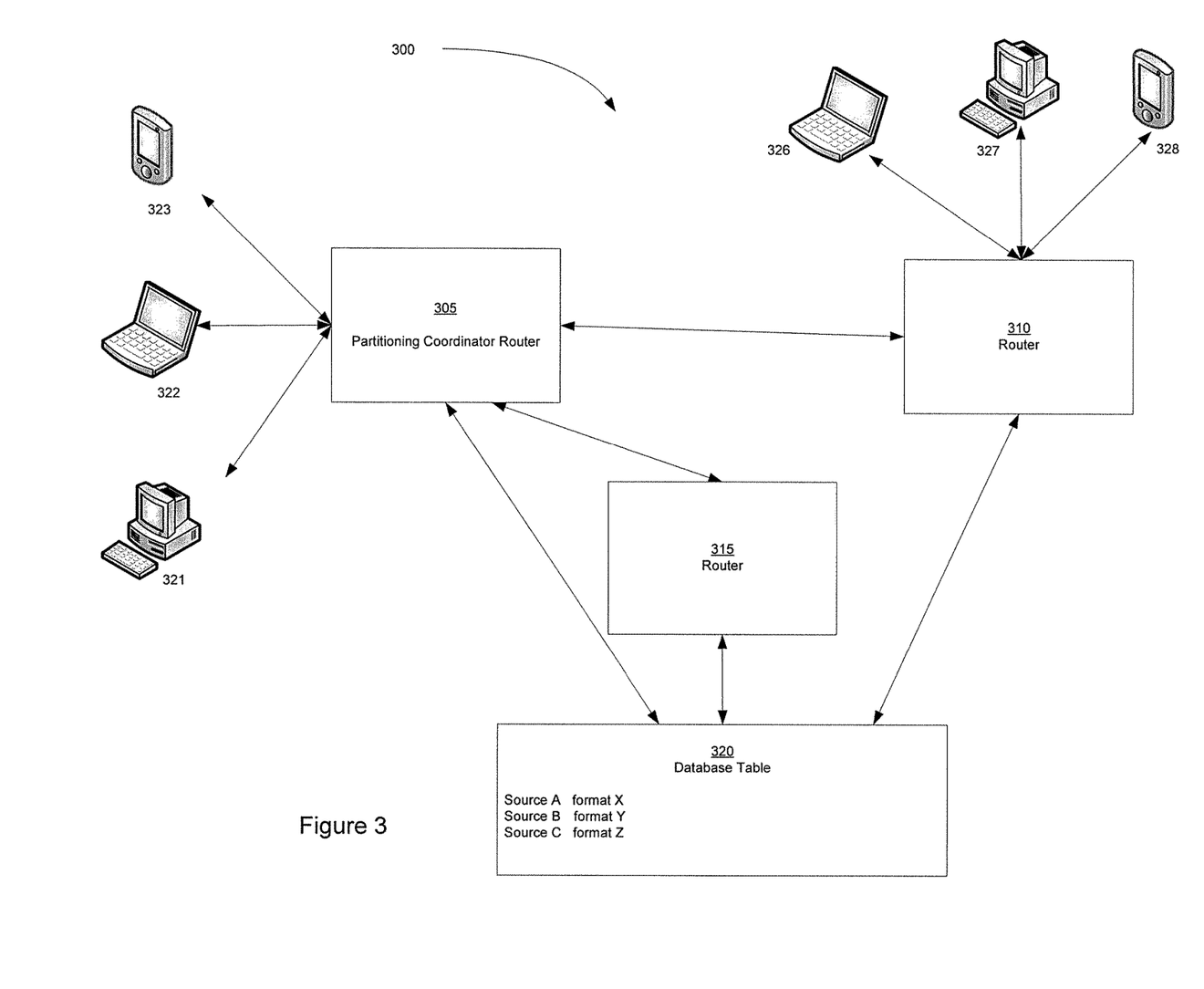
FIG. 3 shows one exemplary distributed computing system that may be used to implement one or more aspects of the invention.

FIG. 2 illustrates a flowchart of one exemplary computer implemented method according to one embodiment of the present invention. In step 205, a router accesses a list of available message sources. The message sources may comprise software applications that are configured to communicate with one another. The software applications may be developed by different vendors and use inconsistent messaging protocols. As illustrated, the messages may comprise information relating to trading, such as clearing information, orders, etc. One exemplary distributed computing system that may be used to implement step 205 is shown in FIG. 3. As seen in FIG. 3, distributed computing system 300 comprises a plurality of routers, such as routers 305, 310, and 315. One skilled in the art will readily appreciate that additional or fewer routers may be utilized in different embodiments of the disclosed invention and three routers are shown for illustrative purposes only. Each of the routers 305, 310, and 315 may access the list of available message sources, such as database table 320. As seen database table 320, a plurality of message sources may be provided. As one skilled in the art will realize, the list of available message sources may be in any form or format as to permit information transfer to and from the routers.

Returning briefly to FIG. 2, step 210 may be initiated to designate one of the plurality of routers as a partitioning coordinator router. The partitioning coordinator router may be the first router to be placed on-line or start. As seen in FIG. 3, router 305 has been designated as the partitioning coordinator router. In at least one embodiment of the invention, any of the plurality of routers in the distributed computing system may serve as the partitioning coordinator router. Each of the plurality or at least a subset of the plurality of routers comprises computer executable instructions to serve as the partitioning coordinator router. Indeed, in yet other embodiments, the duties and partitioning functions of the partitioning coordinator router (described below) may be distributed among several routers.

In the illustrated embodiment, router 305 may be the first router to be placed on-line or otherwise to be detected by the system 300 and therefore determined to be the partitioning coordinator router. As one skilled in the art will readily understand, any set of criteria may be used to determine which router(s) are selected as a partitioning coordinator router, such as for example, reliability, total bandwidth, available bandwidth, status, and or location of the router.

At step 215, the partitioning coordinator router dynamically partitions the available sources among the available plurality of routers. Step 215 may include accessing a list of message sources, such as that in database table 320, and assigning the messages sources to specific routers. The dynamic partitioning allows the sources of the messages to be "assigned" to a router without requiring reconfiguration of the router to specific sources. As seen in FIG. 3, sources 321-323 have been assigned to router 305 and sources 326-328 have been assigned to router 310. When new message sources are added, database table 320 may be updated to list the sources and the sources will be assigned to routers at the next dynamic partitioning step. Dynamic partitioning may be initiated at router start up, periodically, when new sources are added, at a time selected by a user or any other time.

Optional step 220 may be implemented to assign "backup" routers to specific sources. For example, while source 321 is associated with router 305, router 310 may be assigned as a backup router to source 321, wherein upon the malfunctioning of router 305, source 321 may be associated with router 315.

Step 225 may also be implemented to detect the status of one or more of the routers, such as for example, when a router goes "offline", malfunctions, or is overwhelmed with requests. In one embodiment, a status signal may be in the form of a heartbeat signal, wherein heartbeat messages may be transmitted from the routers to ensure they are functioning properly. In one such embodiment, available routers may be deemed "available" if heartbeat messages are received from the routers within a predetermined period of time. Conversely, if a heartbeat signal is not received from a router within a predetermined amount of time, the router may be deemed malfunctioning and any associated sources may be reassigned to other available routers. In those embodiments utilizing a backup router as described above, the available sources may be associated with a predetermined backup router. Yet in other embodiments, the sources associated with the malfunctioning router may be dynamically partitioned by the partitioning coordinator router, for example by initiating step 230.

In yet other embodiments, one or more routers may be configured to send a status signal indicating their status. For example, if router 315 is configured to handle a maximum of 100 message sources per unit of time and is already close to, at, or above that maximum threshold, a status signal may be transmitted from router 315 to another router or any computing device within the computing system 100. The signal may be used to reassign some sources to other available routers. Indeed, one skilled in the art will realize the status signal may be configured to provide any information regarding the status of the router or associated sources.

In the event that a router goes offline, is overwhelmed with requests, or becomes unavailable, step 230 may be implemented to reassign or otherwise associate those sources associated with the particular router with another available router. This is done without requiring manual reprogramming of each router. Likewise step 230 may be implemented to reassign sources when a new router becomes available, underutilized or otherwise desirable to have the source associated with. As one skilled in the art will realize, all the reassigned sources may not collectively be reassigned to another router, but rather may distributed among other routers depending on a myriad of factors, such as the format and/or content of messages being communicated to/from those sources.

Figure 4:
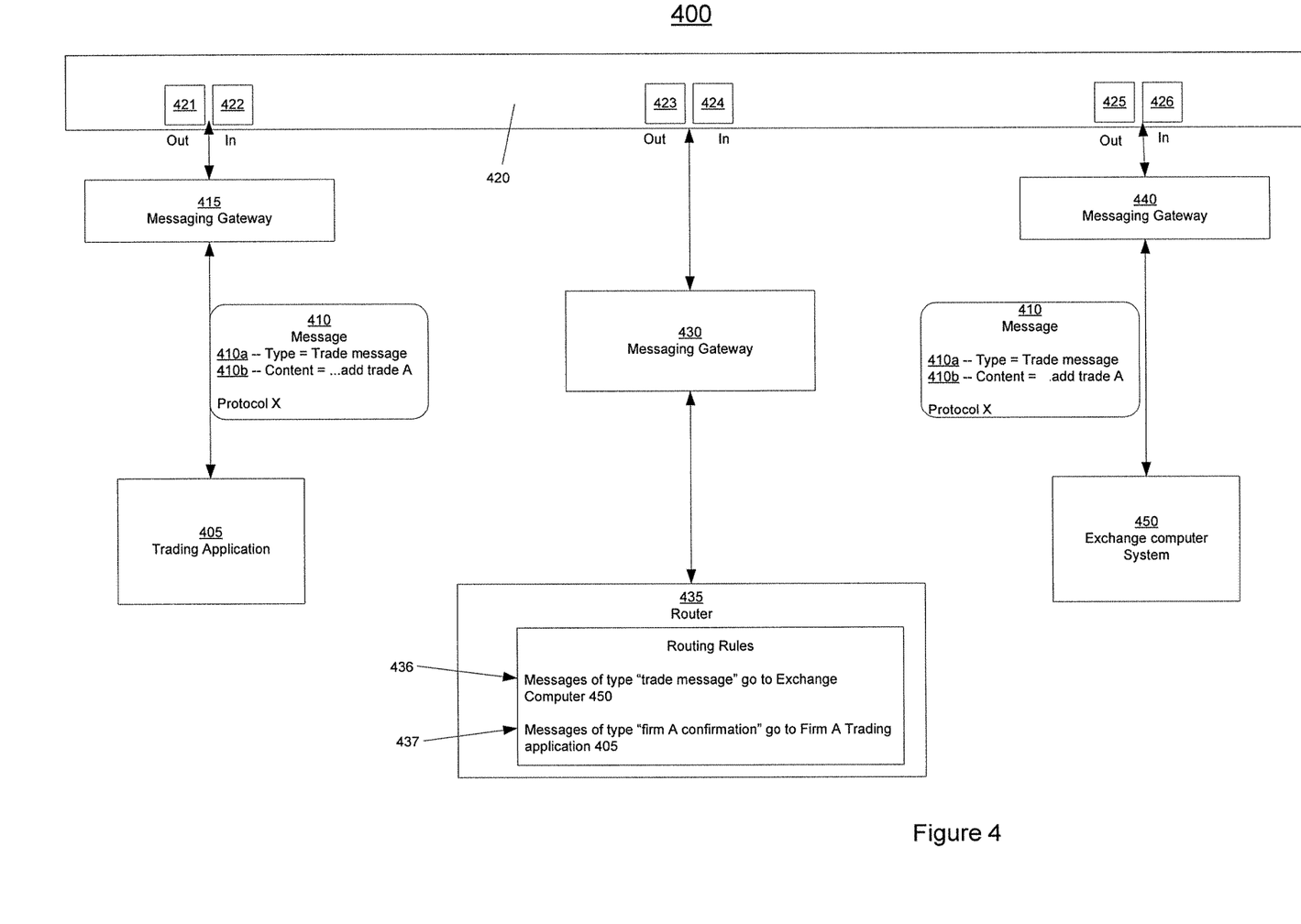
FIG. 4 shows one illustrative trading application communicating with an exchange computer system through at least one router in a distributed computer environment according to an embodiment of the invention.

FIG. 4 shows one illustrative trading application communicating with an exchange computer system through at least one router in a distributed computer environment according to one embodiment of the invention. For example trading application 405 may be configured to initiate an order or otherwise transmit and receive trading data with one or more computers in a distributed computing system. As seen in FIG. 4, trading application 405 is configured to be in operative communication with exchange computer system 450 through the distributed computing system 400. As will be explained in greater detail below, trading application 405 may be configured to communicate with a plurality of computers, some of which may have differing functions than exchange computer system 450.

In one embodiment, trading application 405 may be a source, (such as source 321) that is associated with router 435. As previously discussed, in such an embodiment, trading application 405 may be associated with another router if router 435, for example, becomes unavailable or overwhelmed with other sources. Trading application 405 may be for example, software, hardware, firmware, or indeed any computer readable instructions capable of sending and/or receiving a message or permitting other instructions to send and/or receive a message to another computing device. The trading application may communicate with other peripherals and computers within the system 400 by wired or wireless protocols.

In the illustrated embodiment, trading application 405 is configured to transmit message 410. Message 410 comprises a message type 410*a* and content 410*b*. The message type may be used to categorize the type of message. For example, the message type 410*a* indicates that message 410 is a trade message. One skilled in the art will realize that the system 400 may be configured to allow a vast array of message categories that may be updated or otherwise changed over time by an administrator or end users. Indeed, in one embodiment, the type of the message determines one or more transport protocols that may be used to transport the message. In the illustrated embodiment, message 410 includes content 410*b* comprising "add trade A". While the content in message 410 is in plain text, it is to be understood that any alphanumeric combination may be used. Indeed, in one embodiment, the content of the message may be computer executable code. Message 410 may be in any format, including propriety or open-source. The label "Protocol X" has been placed within the message to more readily illustrate aspects of the invention to the reader. As discussed above and throughout the specification, the format and protocol of messages may be distinct from other messages from other applications and/or sources communicating within the distributed computing system 400.

As seen in the FIG. 4, message 410 may then be received at messaging gateway 415. Messaging gateway 415 is configured to place message 410 and other received messages into a proper format to be transferred through a transport mechanism, such as transport mechanism 420. Transport mechanism 420 may be any computer aided method of transmitting data, such as sockets, e-mail servers, or indeed any method known to those skilled in the art or developed in the art to electronically transport information. For example, in one embodiment the message may be in HTML format and transported across the web or other network supporting HTML, whereas in another embodiment a plurality of differing transport mechanisms are utilized to deliver the messages.

As one skilled in the art will readily appreciate, trading messages may not be received at a messaging gateway in the order it was received. For example, source 327 may be in communication with message gateway 310 through a high speed connection that allows more messages to be received in a shorter time frame than a message received from source 328. It is often important to process the trading messages in a sequential order. In one embodiment of the invention, the messages entering the message gateway further comprise a message ID or other mechanism to allow the message gateways to determine the proper sequence of the messages. Therefore, although the message gateways may be configured to simultaneously process a plurality of messages (even from different sources), the message gateway may be configured to allow concurrent processing with sequence preservation.

The transport mechanism may communicate with a plurality of messaging gateways, such as messaging gateways 415, 430 and 440 through one or more input ports (see, for example, ports 422, 424, and 426) and one or more output ports (see, for example, ports 421, 423, and 425). For example, outgoing message 410 may be received in input port 422 and transmitted first to messaging gateway 430 through output port 423. As seen in FIG. 4, messaging gateway 430 is associated with router 435, wherein messaging gateway 430 may be configured to listen for messages transmitted to or otherwise received at the router 435. While the figure shows the messaging gateways and the router (such as messaging gateway 430 and router 435) as two separate structures, in one alternative embodiment, messaging gateways may perform the function of the disclosed routers and may further allow for point-to-point communications in addition with communications disclosed herein. One or more the disclosed messaging gateways may also be configured to manage transactions and threads on behalf of client systems, which may include routers. Transactions may include the reading of messages from sources, writing messages to destinations and processes performed in between by a router or other components(s). In one embodiment, transactions are structured so that all work commits or rolls back as one. Many of the aspects of the invention are illustrated to the user as individual structures to more readily portray to various embodiments; however, each of the illustrated structures may be combined.

As router 435 illustrates, a set of routing rules may be applied to a message incoming to the router. The routing rules may be stored on a computer readable medium within a router, for example, a partitioning coordinating router, such as router 305, or in a plurality of the routers within the distributed computing system. Rules 436 and 437 provide exemplary rules that may be used in one embodiment of the invention. The routing rules may be configured to allow for content based routing as opposed to point-to-point based routing. As previously mentioned, the content based routing may be accomplished regardless of the protocols of the different sources and/or endpoints.

Looking to rule 436, it has instructions to indicate messages having the content "add trade A" are to be routed to exchange computer system 450. Upon receiving message 410 and analyzing at least a portion of its content with the rules, it is determined where to transmit the message. In the illustrated example, message 410 is transmitted to exchange computer system 450. The message may then be again routed through messaging gateway 430 or a separate gateway to format the outgoing message based on the protocol(s) utilized by the application to receive the message at system 450. In this manner, trading application 405 may utilize a different protocol than exchange computer system 450 and still receive the message without substantial inefficiencies. Messaging gateway 430 may also reformat or adjust the message or container holding the message to a format to properly be transmitted across the transport layer or layers that the message.

Figure 5:
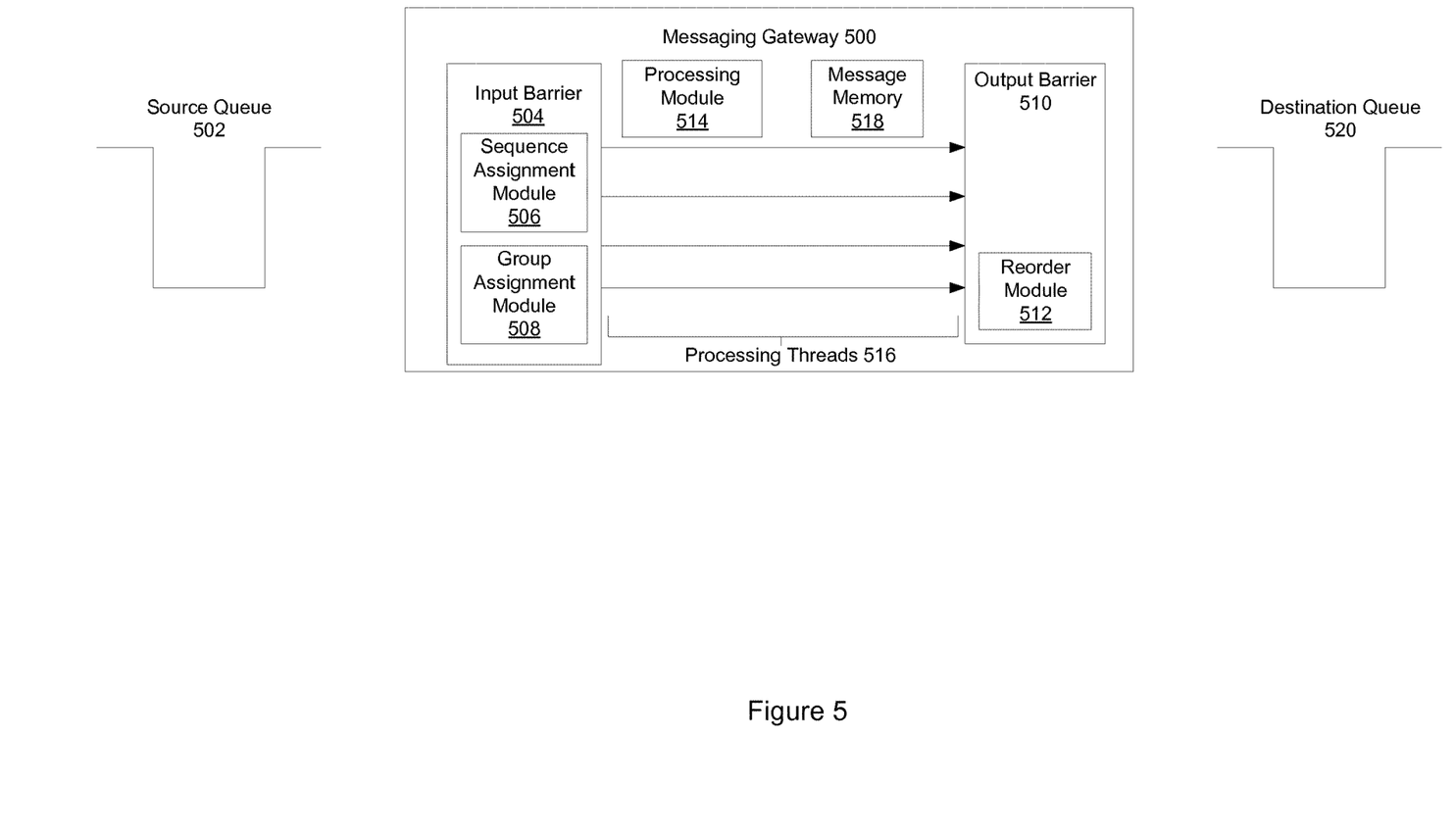
FIG. 5 shows a messaging gateway in accordance with an embodiment of the invention.

FIG. 5 shows a messaging gateway 500, in accordance with an embodiment of the invention. Incoming messages are retrieved from a source queue 502. Source queue 502 may correspond to a port, such as one of ports 421-426. Messages may be received at an input barrier 504. Input barrier 504 may be implemented with hardware and/or software components and may include a sequence assignment module 506 and a group assignment module 508. Sequence assignment module 506 may assign sequence information to received messages. The sequence information may be in the form of information included in message headers. In one particular implementation, sequence information is in the form of 32 bit integer values added to message headers. Group assignment module 508 may assign group information to received messages. The group information may also be added to message hearers.

In one embodiment of the invention sequence identification numbers are assigned sequentially to each incoming message. Group identification numbers are also assigned to every message. If a group of related messages consists of two messages, such as a first order message followed by a second cancel replace message, the first message is assigned a first sequence identification value and a group identification value and the second message is assigned a second sequence identification value and the same group identification value. An output barrier 510 may be implemented with hardware and/or software components and may include a reorder module 512. Reorder module 512 may analyze group and sequence information and control the order at which messages leave message gateway 500. In the example given above, if the second cancel replace message arrives at reorder module 512 before the first order message, reorder module 512 may hold the cancel replace message and allow the order message to leave message gateway 500 before the cancel replace message.

In some embodiments of the invention message gateway 500 only preserves the sequence of messages belonging to the same group. If messages are not part of the same group they may leave messaging gateway 500 in any order. In other embodiments of the invention all messages leave messaging gateway 500 in the sequence assigned by sequence assignment module 506.

Messaging gateway 500 includes a processing module 514 for performing processing operations on incoming messages. Processing may include routing, transformation, persisting, etc. Processing module 514 may be configured to dynamically allocate processing threads 516. The allocation may be a function of the number of messages waiting to be processed and may increase and decrease over time. Each processing thread may be configured to pull messages out of a message queue and process the message. In one embodiment of the invention, only one processing thread is allowed in input barrier 504 at a time. In some embodiments, messaging gateway 500 may utilize transport mechanism processing threads.

As described above, some message may include message types. Processing module 514 may be configured to perform type specific message processing. For example a first message having a first type may be processed in one manner and delivered to destination queue 520 while a second message having a second type may be processed in a different manner and delivered to destination queue 520 or another destination queue.

Messaging gateway 500 may include a message memory 518. Message memory 518 may be used to store some or all of the messages passing through message gateway 500. At the request of a client application, for example, a message may be retrieved and retransmitted to a destination. This may be necessary when a message is corrupted in route to the destination.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention.

What is claimed is:

1. A messaging gateway comprising:
a processor; and
a computer-readable medium coupled to the processor and programmed with computer-executable instructions that, when executed by the processor, cause the messaging gateway at least to perform:
  (a) receiving a plurality of trade messages;
  (b) assigning sequence identification information to at least some of the plurality of trade messages upon receipt in accordance with a receipt order;
  (c) assigning group identification information to at least some of the plurality of trade messages;
  (d) dynamically allocating processing threads within the messaging gateway based on a volume of the plurality of trade messages to concurrently process the trade messages, wherein each processing thread pulls messages out of a messaging queue for formatting; and
  (e) in response to a change in an order of a subset of the trade messages identified during concurrent processing, controlling an order in which the trade messages leave the messaging gateway by reordering the trade messages into a sending order based on the sequence identification information and the group identification information.

2. The messaging gateway of claim 1, wherein the computer-readable medium further includes computer-executable instructions to cause the messaging gateway to perform:
  (f) formatting trade messages into formats consistent with a plurality of transport mechanisms.

3. The messaging gateway of claim 1, wherein (b) comprises inserting sequence values into message headers.

4. The messaging gateway of claim 1, wherein (c) comprises inserting group values into message headers.

5. A distributed computing system for exchanging trading information comprising:
a messaging gateway in operative communication with a plurality of message sources, the messaging gateway configured to
  receive a plurality of trade messages from the plurality of message sources,
  assign sequence information and group information to the trade messages upon receipt in accordance with a receipt order of the trade messages,
  concurrently place the trade messages into formats to be transferred through transport mechanisms via a plurality of processing threads, wherein the sequence information and group information preserves the receipt order during processing of the trade messages including concurrent formatting of the trade messages, and
  reorder the trade messages into a sending order based on the sequence information to preserve the sequence of the trade messages passing through the messaging gateway; and
a plurality of routers, comprising at least one partitioning coordinator router, and each including a computer-readable medium having computer-executable instructions that when executed, cause dynamic partitioning of the plurality of message sources among the plurality of routers.

6. The distributed computing system of claim 5, wherein the messaging gateway is configured to dynamically allocate processing threads to received messages.

7. The distributed computing system of claim 5, wherein the messaging gateway is configured to assign sequences to at least some messages by inserting the sequence information into message headers.

8. The distributed computing system of claim 5, wherein the messaging gateway is configured to assign group information to at least some messages by inserting group information into message headers.

9. A method comprising:
receiving a plurality of trade messages at a messaging gateway;
assigning, by the messaging gateway, sequence identification information to at least some of the plurality of trade messages upon receipt in accordance with a receipt order;
dynamically allocating, by the messaging gateway, processing threads based on a volume of the plurality of trade messages to concurrently process the trade messages; and
controlling, by the messaging gateway and in response to a change in an order of a subset of the trade messages during concurrent processing, an order in which the trade messages leave the messaging gateway by reordering the trade messages into a sending order based on the sequence identification information and based on whether the trade messages are associated with a group of messages.

10. The method of claim 9, comprising formatting trade messages into formats consistent with a plurality of transport mechanisms.

11. The method of claim 9, wherein the assigning comprises inserting sequence values into message headers.

12. The method of claim 9, further comprising assigning group identification information to at least some of the plurality of trade messages.

* * * * *